US012594472B2

(12) United States Patent
Dai

(10) Patent No.: US 12,594,472 B2
(45) Date of Patent: Apr. 7, 2026

(54) ICE CHEST HOLDER STRUCTURE FOR GOLF CART

(71) Applicant: Xiamen Dalle New Energy Automobile Co., Ltd., Xiamen (CN)

(72) Inventor: Side Dai, Xiamen (CN)

(73) Assignee: Xiamen Dalle New Energy Automobile Co., Ltd., Xiamen (CN)

( * ) Notice: Subject to any disclaimer, the term of this patent is extended or adjusted under 35 U.S.C. 154(b) by 51 days.

(21) Appl. No.: 18/772,277

(22) Filed: Jul. 15, 2024

(65) Prior Publication Data

US 2025/0249325 A1 Aug. 7, 2025

(30) Foreign Application Priority Data

Feb. 5, 2024 (CN) .......................... 202420279991.0

(51) Int. Cl.
| | |
|---|---|
| *A63B 55/60* | (2015.01) |
| *B60N 3/10* | (2006.01) |
| *B60R 9/06* | (2006.01) |

(52) U.S. Cl.
CPC .............. *A63B 55/61* (2015.10); *B60N 3/103* (2013.01); *B60R 9/065* (2013.01); *B60Y 2200/86* (2013.01)

(58) Field of Classification Search
CPC .......... A63B 55/61; B60N 3/103; B60R 9/065
See application file for complete search history.

(56) References Cited

U.S. PATENT DOCUMENTS

| | | | | | |
|---|---|---|---|---|---|
| 4,533,013 | A | * | 8/1985 | Hightower ............. | B62K 5/027 280/DIG. 5 |
| 5,806,738 | A | * | 9/1998 | D'Angelo ................ | B60R 9/06 224/521 |
| 7,229,082 | B1 | * | 6/2007 | Wilmarth ............. | B62B 5/0083 280/DIG. 6 |
| 7,866,422 | B2 | * | 1/2011 | Peters .................. | B62D 63/025 296/190.04 |
| 11,155,215 | B1 | * | 10/2021 | Brinkman ................ | B60R 9/06 |
| 11,235,908 | B2 | * | 2/2022 | Yockey .................. | A45C 11/00 |
| 2003/0173122 | A1 | * | 9/2003 | Cassoni ................ | A63B 55/60 180/65.1 |
| 2007/0051763 | A1 | * | 3/2007 | Adrian .................... | B60R 11/00 224/568 |
| 2009/0038864 | A1 | * | 2/2009 | Yun ........................... | B62B 3/12 180/19.1 |
| 2017/0368440 | A1 | * | 12/2017 | Graham ................... | B62B 3/10 |
| 2021/0299530 | A1 | * | 9/2021 | Dai ........................ | B60R 9/06 |
| 2023/0064416 | A1 | * | 3/2023 | Rubanovich .......... | B60N 2/688 |
| 2024/0262304 | A1 | * | 8/2024 | Rutman ................. | B60R 16/03 |

(Continued)

*Primary Examiner* — Brian D Nash
(74) *Attorney, Agent, or Firm* — Bayramoglu Law Offices LLC

(57) ABSTRACT

An ice chest holder structure for a golf cart is provided. The ice chest holder structure includes a fixed holder and a movable holder located on the fixed holder, where sliding tracks are respectively arranged at two sides of the movable holder; fixed ends of the sliding tracks are respectively arranged at two ends of the fixed holder; and an ice chest is placed on the movable holder. In the above solution, to open a lid of the ice chest, there is only a need to pull out the movable holder to make the ice chest go beyond the foldable storage basket, rather than to remove the ice chest from the holder, fully meeting the needs of taking and storing beverages.

3 Claims, 4 Drawing Sheets

(56)  References Cited

U.S. PATENT DOCUMENTS

| 2024/0335035 A1* | 10/2024 | Reese | A47B 88/919 |
| 2025/0205568 A1* | 6/2025 | Lacono | A63B 55/60 |
| 2025/0249323 A1* | 8/2025 | Dai | A63B 55/60 |
| 2025/0249324 A1* | 8/2025 | Dai | A63B 55/61 |
| 2025/0303975 A1* | 10/2025 | Dai | B60R 9/06 |

* cited by examiner

ICE CHEST HOLDER STRUCTURE FOR GOLF CART

CROSS REFERENCE TO THE RELATED APPLICATIONS

This application is based upon and claims priority to Chinese Patent Application No. 202420279991.0, filed on Feb. 5, 2024, the entire contents of which are incorporated herein by reference.

TECHNICAL FIELD

The present disclosure relates to golf carts and in particular to an ice chest holder structure for a golf cart.

BACKGROUND

As shown in FIG. 1, a rear of an existing golf cart is provided with a golf bag holder 1', and a golf bag attachment 3 is provided above the rear of the golf cart. In some design solutions, the golf bag attachment 3 is located above a foldable storage basket 4. An ice chest 2 is placed on the holder 1' when no golf bag is placed, and the ice chest can be opened normally when the foldable storage basket 4 is folded. As shown in FIG. 2, when the foldable storage basket 4 is unfolded, the folding bottom plate of the foldable storage basket extends outward, and the golf bag attachment 3 flips downwards, making it hard to open the ice chest 2 on the holder 1' properly. In other words, to open the ice chest 2 and pick up beverages in the ice chest 2, the ice chest 2 must be removed from the holder 1'.

SUMMARY

An objective of the present disclosure is to provide a holder structure that allows an ice chest to be opened when there is a foldable storage basket above the ice chest.

In order to achieve the above objective, the present disclosure provides an ice chest holder structure for a golf cart, where the ice chest holder structure is located at a golf bag placement position at a rear of the golf cart, and includes a fixed holder and a movable holder located on the fixed holder; sliding tracks are respectively arranged at two sides of the movable holder; fixed ends of the sliding tracks are respectively arranged at two ends of the fixed holder; an ice chest is placed on the movable holder; and a lower edge of a front end of the ice chest and a front end of the movable holder are provided with connecting latches that are mutually clamped.

A rear section of the movable holder is provided with a strong magnet that is attracted to a metal shell of the ice chest.

Wheels at a rear of the ice chest are provided at a rear end of the movable holder, and the fixed holder is provided with two channels for accommodating the wheels of the ice chest.

In the above solution, there is only a need to pull out the movable holder to make the ice chest go beyond the foldable storage basket, rather than to remove the ice chest from the holder. A lid of the ice chest can be opened at an angle not less than 42°, with an opening width of 294 mm, which fully meets the needs of taking and storing beverages.

REFERENCE NUMERALS

1'. holder; 11. movable holder; 111. magnet; 112. latch; 12. fixed holder; 121. ice chest wheel channel; 13. sliding track; 131. sliding track switch; 14. latch; 2. ice chest; 21. ice chest wheel; 3. golf bag attachment; and 4. foldable storage basket.

DETAILED DESCRIPTION OF THE EMBODIMENTS

For detailed description of the technical contents, technical features, objectives, and effects of the present disclosure, the present disclosure is described below with reference to implementations and drawings.

Figure 1:
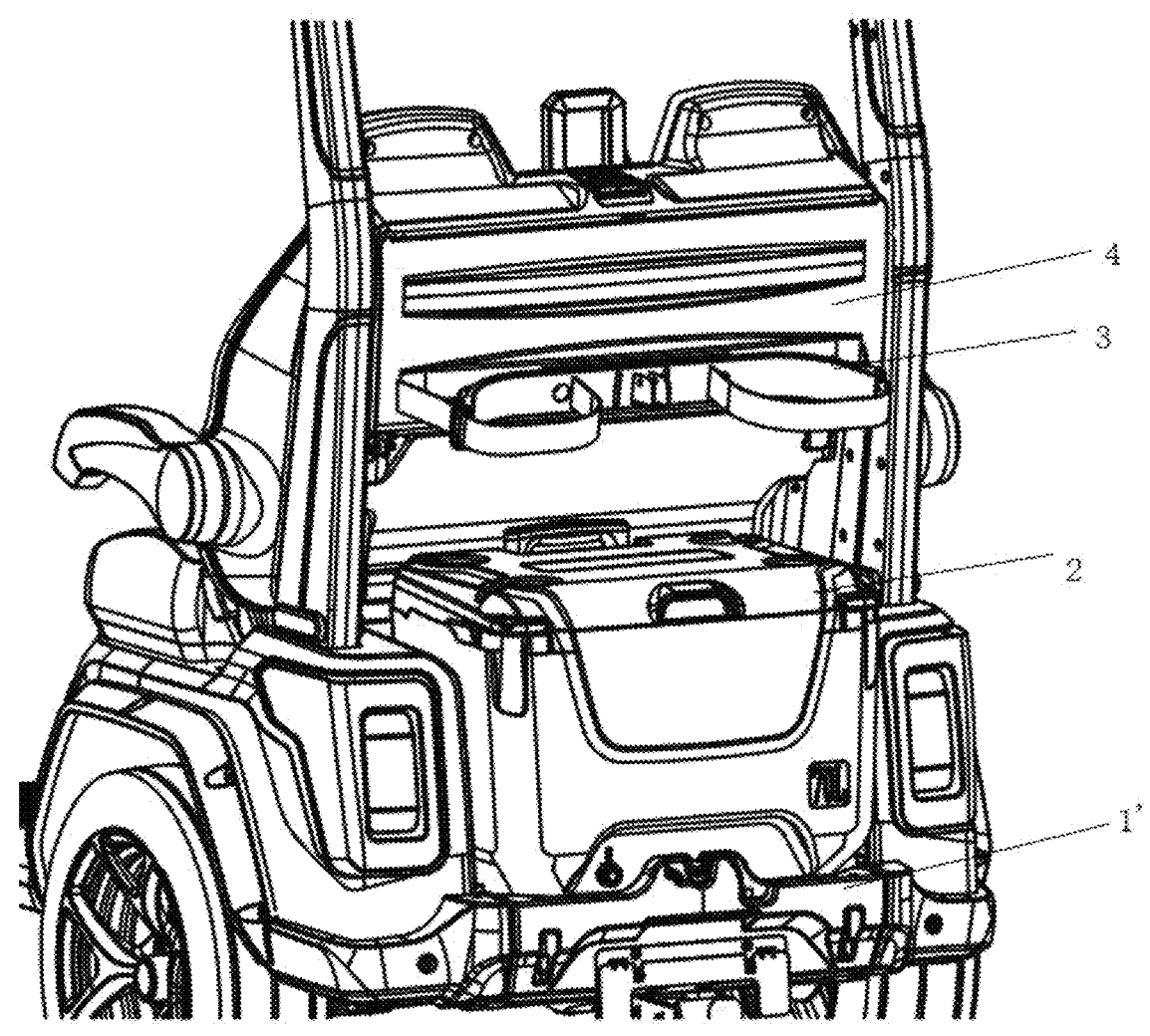
FIG. 1 is a schematic diagram of a foldable storage basket in a folded state in the prior art.
Figure 2:
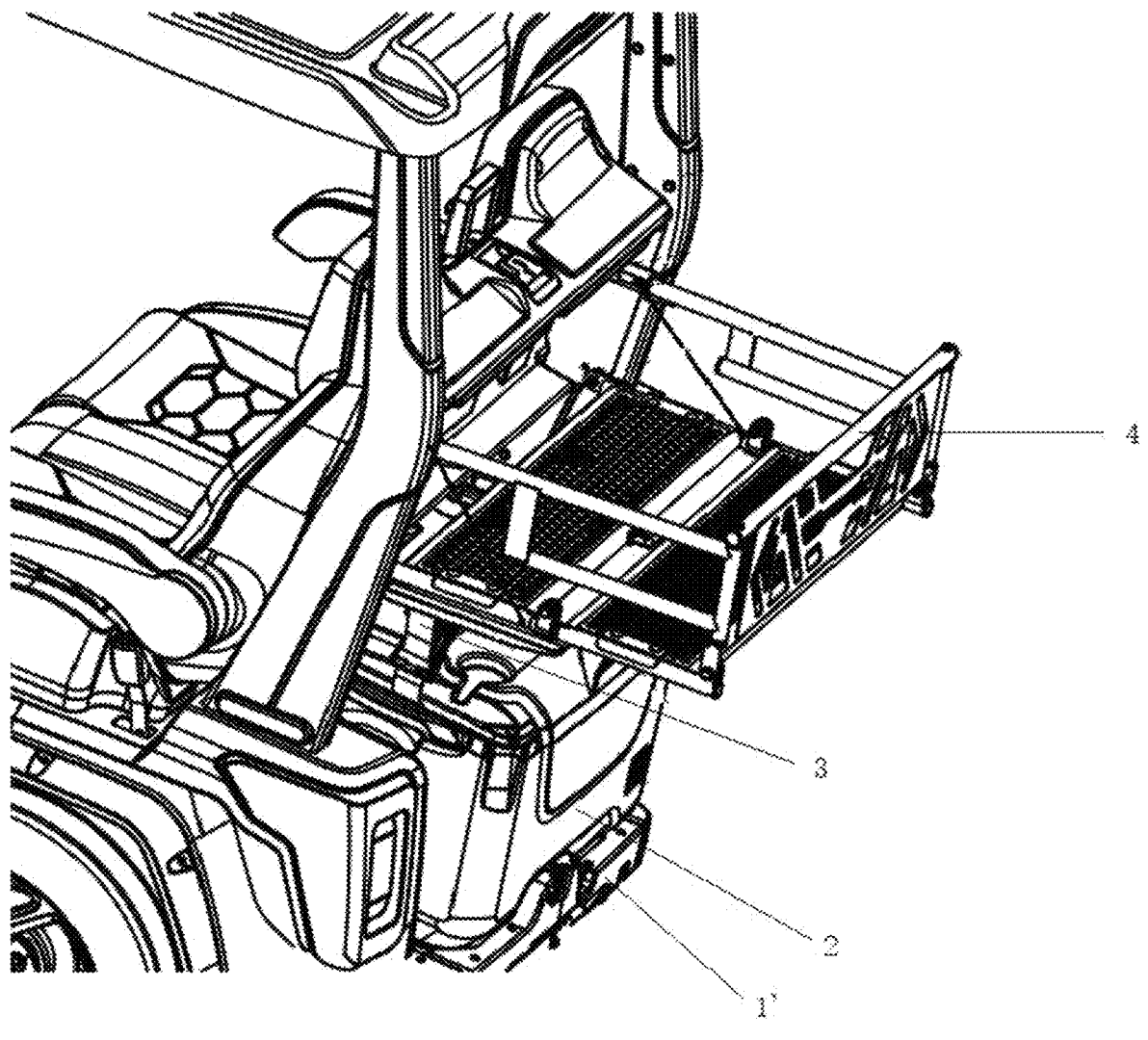
FIG. 2 is a schematic diagram of the foldable storage basket in an unfolded state in the prior art.
Figure 3:
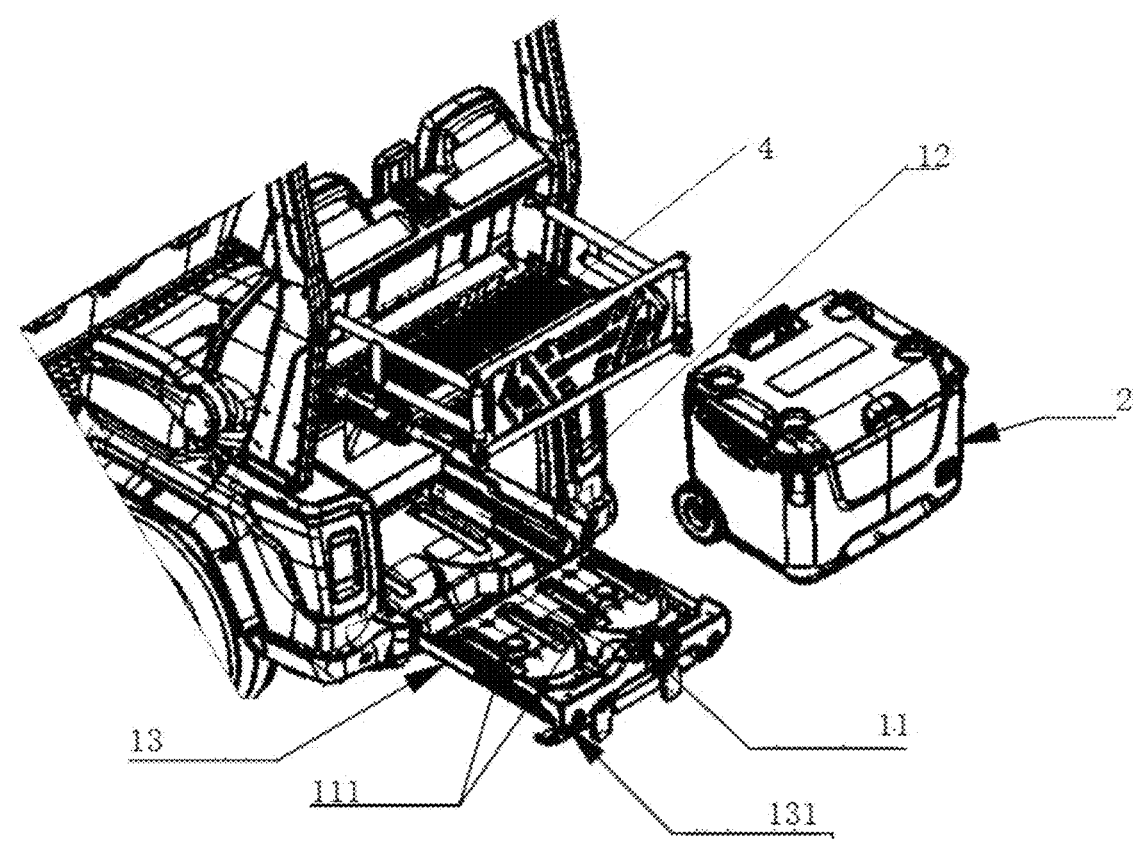
FIG. 3 is a structural diagram of an ice chest holder structure for a golf cart according to the present disclosure.
Figure 4:
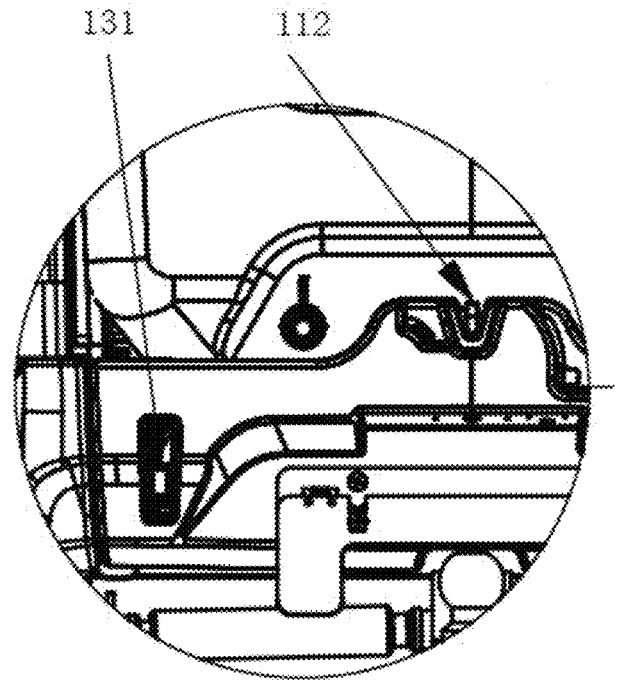
FIG. 4 is a schematic diagram of a latch and a sliding track switch according to the present disclosure.
Figure 5:
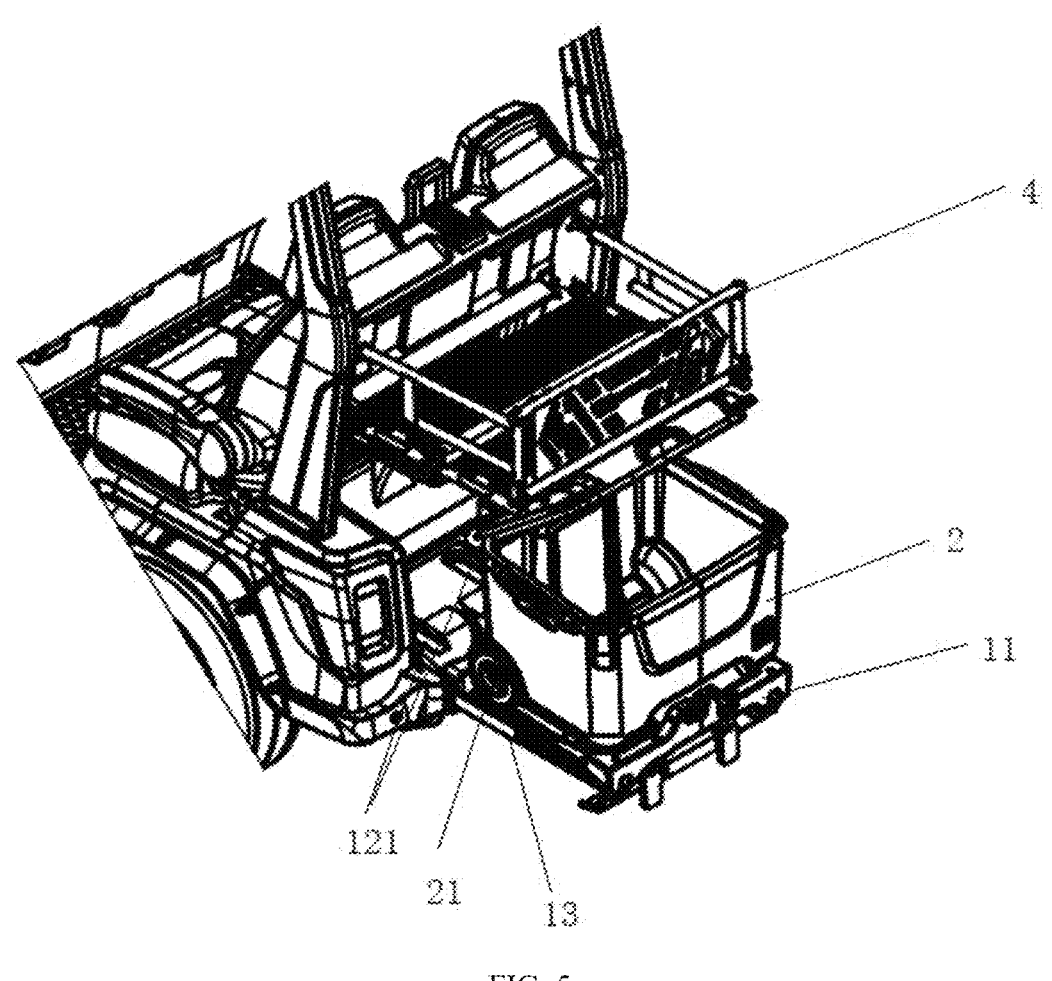
FIG. 5 is a schematic diagram of the ice chest holder structure in a use state according to the present disclosure in a folded state.

As shown in FIGS. 3 and 4, the present disclosure provides an ice chest holder structure for a golf cart. The ice chest holder structure is located at a golf bag placement position at a rear of the golf cart, and includes fixed holder 12 and movable holder 11 located on the fixed holder 12. Sliding tracks 13 are respectively arranged at two sides of the movable holder 11 (sliding track switches 131 are arranged at a front end of the movable holder 11, which is a well-known structure). Fixed ends of the sliding tracks 13 are respectively arranged at two ends of the fixed holder 12. Ice chest 2 can be placed on the movable holder 11, and the ice chest 2 can also be removed from the movable holder. A lower edge of a front end of the ice chest 2 and the front end of the movable holder are provided with connecting latches 112 that are mutually clamped. The structure of the connecting latches 112 is the same as that of a trunk latch. A rear section of the movable holder 11 is provided with strong magnet 111 that is attracted to a metal shell of the ice chest 2. Lower ends of wheels 21 at a rear of the ice chest 2 are clamped at a rear end of the movable holder 11 to ensure that the ice chest 2 is attracted to the strong magnet 111. The fixed holder 12 is provided with two channels for accommodating the wheels 21 at the rear of the ice chest 2 when the movable holder 11 is pushed forward.

There is only a need to pull out the movable holder to make the ice chest go beyond the foldable storage basket, rather than to remove the ice chest from the holder. A lid of the ice chest can be opened at an angle not less than 42°, with an opening width of 294 mm, which fully meets the needs of taking and storing beverages.

The above described are merely embodiments of the present disclosure, which are not intended to limit the scope of patent protection of the present disclosure. Any equivalent structure or structural transformation made based on the specification and drawings of the present disclosure, or direct or indirect application of the present disclosure in other related technical fields, should fall within the scope of patent protection of the present disclosure.

What is claimed is:

1. An ice chest holder structure for a golf cart, configured to be mounted at a golf bag placement position at a rear of the golf cart, comprising: a fixed holder having opposite ends and a movable holder slidably located on and supported by the fixed holder; sliding tracks are respectively arranged at two sides of the movable holder; fixed ends of the sliding tracks are respectively arranged at two ends of the fixed holder; a front-end connecting latch on the movable holder configured to clamp with a complementary latch on a lower edge of a front end of an ice chest; a magnet disposed at a rear section of the movable holder configured to magnetically attract a metal shell of the ice chest; and a pair of channels formed in the fixed holder and spaced to correspond to rear wheels of the ice chest such that the rear wheels drop into the channels when the movable holder is pushed forward, wherein a rear end of the movable holder is configured to clamp lower ends of the rear wheels to maintain magnetic attraction between the magnet and the metal shell.

2. The ice chest holder structure for the golf cart according to claim 1, wherein the front-end connecting latch has a structure the same as that of a trunk latch.

3. The ice chest holder structure for the golf cart according to claim 1, wherein sliding track switches are arranged at a front end of the movable holder.

* * * * *